US009099027B2

(12) United States Patent
Tomita

(10) Patent No.: US 9,099,027 B2
(45) Date of Patent: Aug. 4, 2015

(54) DISPLAY PANEL DRIVING DEVICE HAVING PLURAL DRIVER CHIPS RESPONSIVE TO CLOCK SIGNAL WITH STABLE DUTY RATIO

(75) Inventor: Takashi Tomita, Tokyo (JP)

(73) Assignee: LAPIS SEMICONDUCTOR CO., LTD., Yokohama (JP)

(*) Notice: Subject to any disclaimer, the term of this patent is extended or adjusted under 35 U.S.C. 154(b) by 493 days.

(21) Appl. No.: 13/240,450

(22) Filed: Sep. 22, 2011

(65) Prior Publication Data

US 2012/0081349 A1 Apr. 5, 2012

(30) Foreign Application Priority Data

Oct. 4, 2010 (JP) ................................ 2010-224816

(51) Int. Cl.

| | |
|---|---|
| ***G06F 3/038*** | (2013.01) |
| ***G09G 3/20*** | (2006.01) |
| ***G09G 3/36*** | (2006.01) |

(52) U.S. Cl.

CPC ................ *G09G 3/20* (2013.01); *G09G 3/3685* (2013.01); *G09G 2310/027* (2013.01); *G09G 2310/08* (2013.01); *G09G 2320/041* (2013.01); *G09G 2330/021* (2013.01)

(58) Field of Classification Search

CPC . G09G 3/20; G09G 3/3685; G09G 2330/021; G09G 2310/08

USPC ............ 345/204–699; 713/400, 375; 327/276

See application file for complete search history.

(56) References Cited

U.S. PATENT DOCUMENTS

| | | | | |
|---|---|---|---|---|
| 5,585,816 | A * | 12/1996 | Scheffer et al. | 345/100 |
| 5,729,316 | A * | 3/1998 | Yamamura et al. | 349/150 |
| 5,805,003 | A * | 9/1998 | Hsu | 327/270 |
| 6,124,733 | A * | 9/2000 | Sharpe-Geisler | 326/83 |
| 6,204,710 | B1 * | 3/2001 | Goetting et al. | 327/276 |
| 6,211,849 | B1 * | 4/2001 | Sasaki et al. | 345/55 |
| 6,289,068 | B1 * | 9/2001 | Hassoun et al. | 375/376 |
| 6,448,830 | B1 * | 9/2002 | Chuang et al. | 327/205 |
| 2004/0179003 | A1 * | 9/2004 | Jang | 345/204 |
| 2005/0285641 | A1 * | 12/2005 | Miyata et al. | 327/156 |

FOREIGN PATENT DOCUMENTS

| | | |
|---|---|---|
| JP | 63-226110 A | 9/1988 |
| JP | 64-010718 | 1/1989 |
| JP | 10-153760 | 6/1998 |

OTHER PUBLICATIONS

Notice of Rejection dated Aug. 5, 2014.
Japanese Notice of Rejection dated Apr. 18, 2014.

* cited by examiner

*Primary Examiner* — Charles V Hicks
*Assistant Examiner* — Charles Zheng
(74) *Attorney, Agent, or Firm* — Volentine & Whitt, PLLC

(57) ABSTRACT

A display panel driving device has a signal line driver. The signal line driver applies a pixel driving voltage based on an input image signal to each signal line of a display panel at a timing corresponding to a clock signal. The signal line driver is divided into a plurality of driver chips connected in cascade by the clock line. The display panel driving device supplies a clock signal through the driver chips. The duty ratio of the clock signal is stabilized when the clock signal passes through the driver chips, without leading to an increase in power consumption and in manufacturing costs.

13 Claims, 12 Drawing Sheets

DISPLAY PANEL DRIVING DEVICE HAVING PLURAL DRIVER CHIPS RESPONSIVE TO CLOCK SIGNAL WITH STABLE DUTY RATIO

BACKGROUND OF THE INVENTION

1. Field of the Invention

The present invention relates to a display panel driving device that drives a display panel.

2. Description of Related Art

A liquid crystal display device includes a liquid crystal display panel. The liquid crystal display panel has a plurality of scan lines and a plurality of signal lines. The signal lines cross each of the scan lines. The liquid crystal display panel also has pixel units, which are formed at portions where the scan lines and signal lines cross each other. The liquid crystal display device also includes a display panel driving device. The driving device has a scan line driver, which supplies a selection signal to each of the scan lines, and a signal line driver, which supplies a pixel data signal to each of the signal lines.

The signal line driver is divided into a plurality of driver ICs (Integrated Circuits) (see FIG. 2 of Japanese Patent Application (Kokai) Publication No. 10-153760, for example). Each driver IC includes a semiconductor IC. The driver ICs are connected in cascade by a power line and a passage line (10). The power line extends along the driver ICs, and is connected to the passage line (10). The passage line (10) connects each two adjacent driver ICs. A clock line (CLK) is included in the passage line (10). The passage line (10) passes through the drivers IC, and is used to transmit a pixel data signal, a clock signal, and various control signals. Each driver IC (see FIG. 3 of Japanese Patent Application (Kokai) Publication No. 10-153760, for example) accepts a pixel data signal in synchronization with a clock signal supplied via the clock line (CLK) and a buffer (4). The driver IC then supplies the pixel data signal to a control logic CT. The control logic CT supplies to the signal lines of the liquid crystal panel a driving voltage corresponding to the pixel data signal.

Each driver IC receives the clock signal via the buffer (4) and sends the clock signal to a subsequent driver IC through another buffer (8) and the clock line (CLK). In this "subsequent driver IC," the clock signal is supplied from the preceding driver IC via the clock line (CLK) and the buffer (4). This clock signal is then supplied to a next driver IC via the buffer (8) and the clock line (CLK).

As described above, a plurality of driver ICs are connected in cascade, and a clock signal is therefore transmitted through each driver IC. As a result, the duty ratio of the clock signal gradually changes. Therefore, the duty ratio of the clock signal in one driver IC could be different from the duty ratio of the clock signal in another downstream driver IC.

In order for the clock signal to be transmitted to the subsequent driver IC with the clock signal duty ratio kept at a constant level, a duty cycle regulator is provided in each driver IC (see FIG. 3 of Japanese Patent Application Publication No. 10-153760). The following duty cycle regulators have been proposed: a duty cycle regulator that uses a PLL (Phase-Locked Loop) circuit (see FIG. 4 of Japanese Patent Application Publication No. 10-153760); and a duty cycle regulator that uses a DLL (Delay Locked Loop) circuit (see FIG. 7 of Japanese Patent Application Publication No. 10-153760). If a duty cycle regulator is equipped with the PLL or DLL circuit in each driver IC, a clock signal supplied from a preceding driver IC undergoes a waveform shaping process in that driver IC and then transmitted to a next driver IC. Therefore, in all the driver ICs, the duty ratio of the clock signal remains unchanged at a constant level.

However, the PLL and DLL circuits are large in size, resulting in an increase in power consumption as well as in manufacturing costs.

SUMMARY OF THE INVENTION

An object of the present invention is to provide a display panel driving device which supplies a clock signal through a plurality of driver chips connected in cascade, with a duty ratio of the clock signal being kept stable and without leading to an increase in power consumption as well as in manufacturing costs.

According to one aspect of the present invention, there is provided a display panel driving device that includes a signal line driver to apply, on the basis of an input image signal (video signal), a pixel driving voltage to each of signal lines of a display panel. The display panel has a plurality of scan lines and the signal lines. A number of pixel units are formed at crossing points of the scan lines and the signal lines. The signal lines are grouped into a plurality of signal line groups. The signal line driver includes a plurality of semiconductor chips, which correspond to the signal line groups respectively. The signal groups are connected in cascade through a clock line. Each of the semiconductor chips includes a pixel driving voltage generation unit, which applies the pixel driving voltage to each of signal lines belonging to the signal line group concerned at a timing corresponding to a clock signal supplied via the clock line. Each semiconductor chip also includes a clock transmission unit, which transmits the clock signal supplied via the clock line to a subsequent semiconductor chip via the clock line. The clock transmission unit includes a ½ frequency division circuit, which generates a frequency-half-divided clock signal by half-dividing a cycle of the supplied clock signal by 2. The clock transmission unit also includes a delay circuit, which generates a delayed frequency-divided clock signal by delaying the ½-frequency clock signal by a predetermined delay time. The clock transmission unit also includes an Exclusive NOR gate, which generates and transmits to the subsequent semiconductor chip via the clock line a shaped clock signal having a first level when a logic level of the delayed frequency-divided clock signal is equal to a logic level of the ½-frequency clock signal, and having a second level when the logic levels are different.

In each of the driver chips that are connected in cascade, the clock signal supplied is subjected to the following waveform shaping process before being transmitted to the subsequent driver chip. That is, a clock signal having a first level is generated when a logic level of a frequency-half-divided clock signal is equal to a logic level of a delayed frequency-divided clock signal whereas a clock signal having a second level is generated when the logic levels are different. Then, the resulting clock signal is supplied to the subsequent driver chip. In this manner, a waveform shaping process is performed so that an interval between the adjoining edges of the supplied clock signal is fixed by the predetermined delay time. The shaped clock signal, which is obtained by the waveform shaping process, is then transmitted to the subsequent driver chip.

Therefore, according to the display panel driving device of the present invention, even when a change in the duty ratio of a clock signal occurs in each driver chip, the change is not reflected in the clock signal transmitted to the subsequent driver chip. Accordingly, it is possible to align edge timings of the supplied clock signal in one and subsequent driver chips.

The waveform shaping process is carried out by the following three components: the frequency division circuit, which frequency-divides a cycle of the clock signal by 2; the delay circuit, which delays the frequency-divided clock signal by a predetermined delay time; and an Exclusive NOR gate, which generates a clock signal having logic level 1 when the logic levels of output signals from both these circuits are equal, and a clock signal having logic level 0 when the logic levels of the two output signals are different. Thus, when compared with those that successively adjust the duty ratio of the clock signal using the PLL circuit or DLL circuit, the circuitry size can be made smaller in the present invention. Therefore, it is possible to curb an increase in power consumption as well as in manufacturing costs.

These and other objects, aspects and advantages of the present invention will become apparent to those skilled in the art from the following detailed description when read and understood in conjunction with the appended claims and drawings.

DETAILED DESCRIPTION OF THE INVENTION

In a display panel driving device of the present invention, a signal line driver, which applies a pixel driving voltage based on an input image signal to each signal line of a display panel at a timing corresponding to a clock signal, is built by a plurality of driver chips that are connected in cascade by the clock line. The clock transmission unit is provided in each driver chip in the following manner: The clock transmission unit transmits to a subsequent driver chip a shaped clock signal having a first level when a logic level of a ½ frequency clock signal is equal to a logic level of a delayed ½ frequency clock signal, or a shaped clock signal having a second level when the logic levels of the two clock signals are different.

Figure 1:
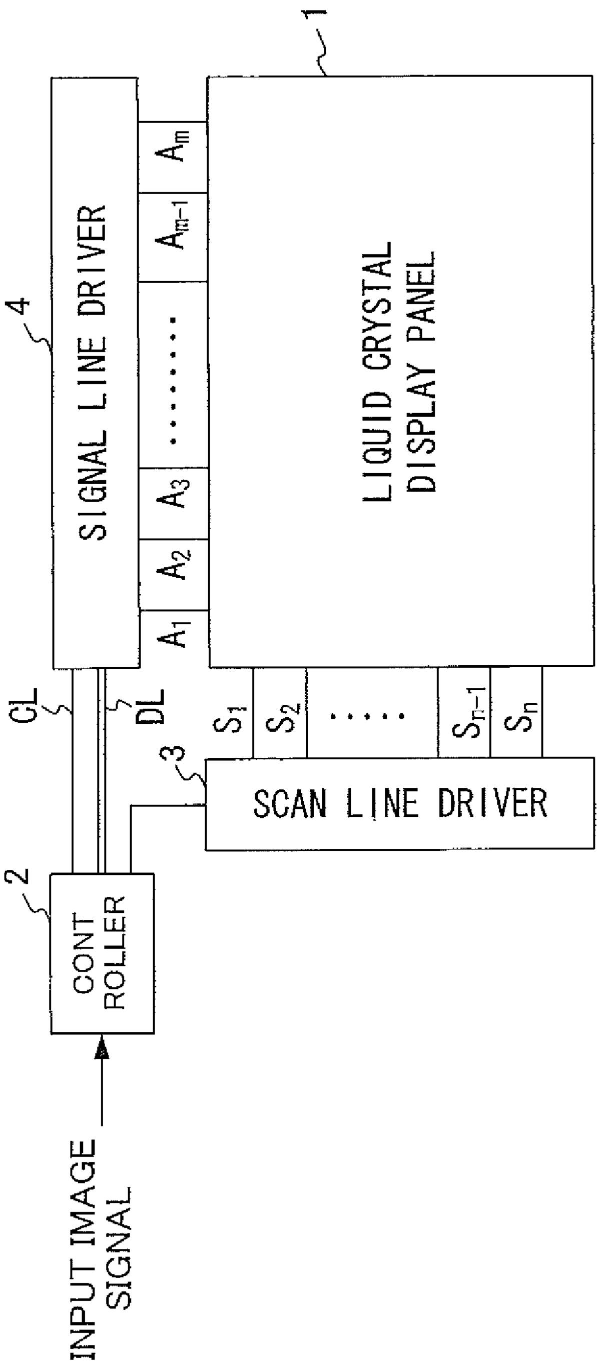
FIG. 1 is a block diagram showing the schematic configuration of a liquid crystal display device which has a driving device according to one embodiment of the present invention.

Referring to FIG. 1, a schematic configuration of a liquid crystal display device having a liquid crystal display panel 1 is described.

In FIG. 1, the liquid crystal display panel 1 includes a plurality of scan lines $S_1$ to $S_n$ (n is an integer greater than one), a plurality of signal lines $A_1$ to $A_m$ (m is an integer greater than one), which cross the scan lines $S_1$ to $S_n$, and pixel units, which are formed at crossing portions of the scan lines and signal lines. A controller 2 supplies to a scan line driver 3 a scan line control signal corresponding to an input image signal. The controller 2 also supplies, for example, an 8-bit pixel data signal of each pixel, which is based on the input image signal, to a signal line driver 4 via a data line DL. Moreover, the controller 2 supplies a clock signal CLK, which is used to latch the pixel data signal, to the signal line driver 4 via a clock line CL.

In response to a scan line control signal supplied from the controller 2, the scan line driver 3 sequentially supplies a scan line selection signal to each of the scan lines $S_1$ to $S_n$ in the liquid crystal display panel 1.

In response to a clock signal CLK supplied from the controller 2, the signal line driver 4 accepts the pixel data signal, and generates a pixel driving voltage of each pixel on the basis of the pixel data signal. Then, the signal line driver 4 applies the pixel driving voltage to each of the signal lines $A_1$ to $A_m$ of the liquid crystal display panel 1.

Figure 2:
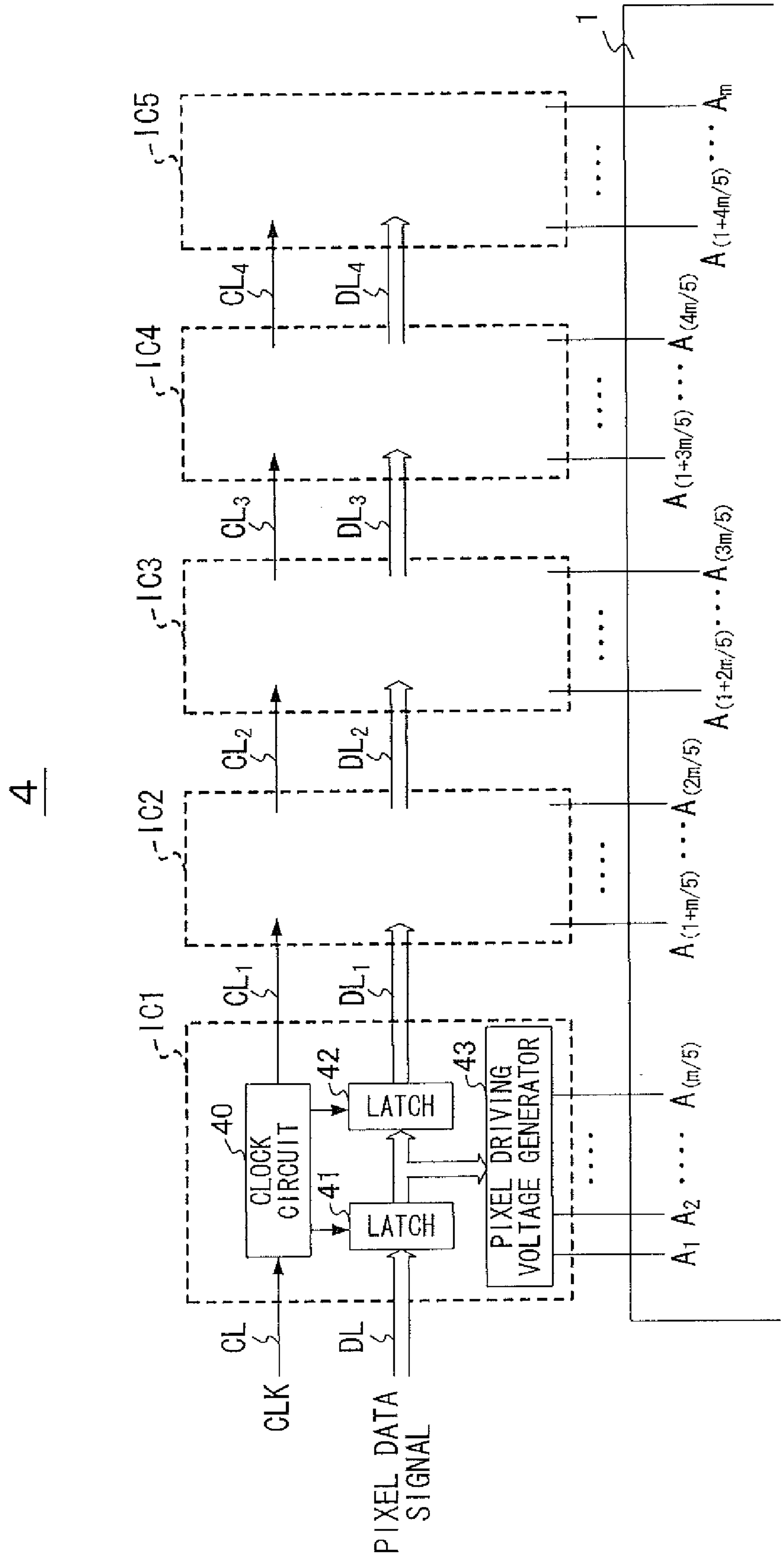
FIG. 2 is a block diagram showing the internal configuration of a signal line driver.

Referring to FIG. 2, the internal configuration of the signal line driver 4 is described.

As shown in FIG. 2, the signal lines $A_1$ to $A_m$ of the liquid crystal display panel 1 are grouped into first to fifth signal line groups. The signal line driver 4 includes five semiconductor IC driver chips IC1 to IC5 (simply referred to as driver chips IC1 to IC5) that are used to drive the first to fifth signal line groups, respectively.

The driver chips IC1 to IC5 have the same internal configuration. Each of the driver chips IC1 to IC5 includes a clock transmission circuit 40, latches 41 and 42, and a pixel driving voltage generation circuit 43.

The latch 41 accepts a pixel data signal supplied via the data line DL in synchronization with a clock signal supplied from the clock transmission circuit 40, and supplies the pixel data signal to the downstream latch 42 and the pixel driving voltage generation circuit 43. The latch 42 accepts the pixel data signal from the latch 41 in synchronization with a clock signal supplied from the clock transmission circuit 40, and supplies the pixel data signal to the subsequent driver chip through the data line DL.

The pixel driving voltage generation circuit 43 generates, on the basis of the pixel data signal supplied from the latch 41, a pixel driving voltage corresponding to the associated m/5 signal lines that this driver chip handles, and applies the pixel driving voltage to each of the signal lines concerned.

The clock transmission circuit 40 supplies to the latches 41 and 42 a clock signal CLK supplied via the clock line CL. The clock transmission circuit 40 also performs a waveform shaping process (will be described later) that brings the duty ratio of the clock signal CLK to a predetermined duty ratio (or to a fixed value), and transmits the resulting signal to the subsequent driver chip via the clock line CL. In one example shown in FIG. 2, the clock transmission circuit 40 of the driver chip IC1 receives a clock signal CLK from the controller 2 and transmits the waveform-shaped clock signal to the subsequent driver chip IC2 via the clock line $CL_1$. The clock transmission circuit 40 of the driver chip IC2 carries out a similar waveform shaping process and transmits the waveform-shaped clock signal to the subsequent driver chip IC3 via a clock line $CL_2$. The clock transmission circuit 40 of the driver chip IC3 applies another waveform shaping process on the received clock signal and transmits the waveform-shaped clock signal to the subsequent driver chip IC4 via a clock line $CL_3$. The clock transmission circuit 40 of the driver chip IC4 applies another waveform shaping process on the received clock signal and transmits the waveform-shaped signal to the subsequent driver chip IC5 via a clock line $CL_4$.

Figure 3:
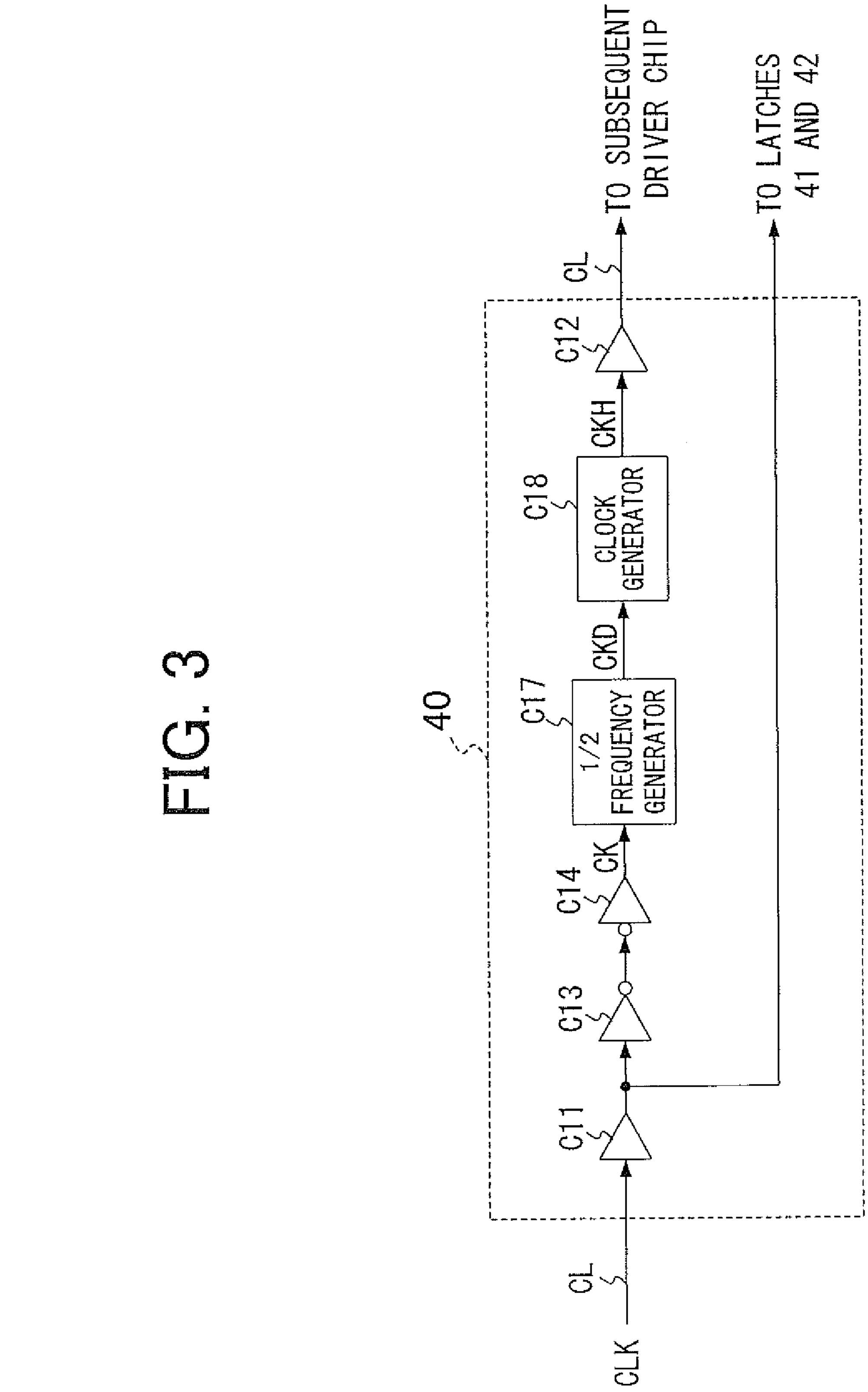
FIG. 3 is a block diagram showing the internal configuration of a clock transmission circuit.

Referring to FIG. 3, the internal configuration of the clock transmission circuit 40 is described.

As shown in FIG. 3, the clock transmission circuit 40 includes an input buffer C11, an output buffer C12, inverters C13 and C14, a ½ frequency division circuit C17, and a clock generation circuit C18.

The input buffer C11 supplies a clock signal CLK, which is received via a clock line CL, to the inverter C13, as well as to the latches 41 and 42. The inverter C13 inverts a logic level of the clock signal CLK to generate an inverted clock signal, and supplies the inverted clock signal to the inverter C14. The inverter C14 inverts a logic level of the inverted clock signal to generate a signal (i.e., clock signal CK), and supplies the clock signal CK to the ½ frequency division circuit C17.

Figure 4:
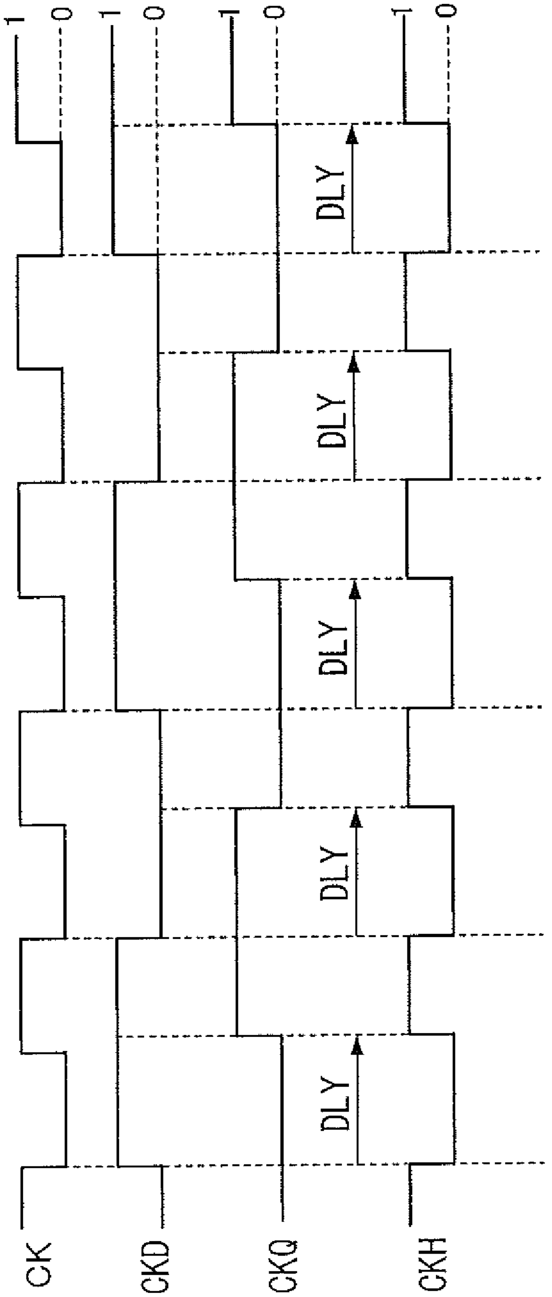
FIG. 4 is a timing chart showing operations of a ½ frequency division circuit and a clock generation circuit.

The ½ frequency division circuit C17 divides a frequency of the clock signal CK by 2 to generate a ½ frequency-divided clock signal CKD as shown in FIG. 4, and supplies the ½ frequency-divided clock signal CKD to the clock generation circuit C18.

Figure 5:
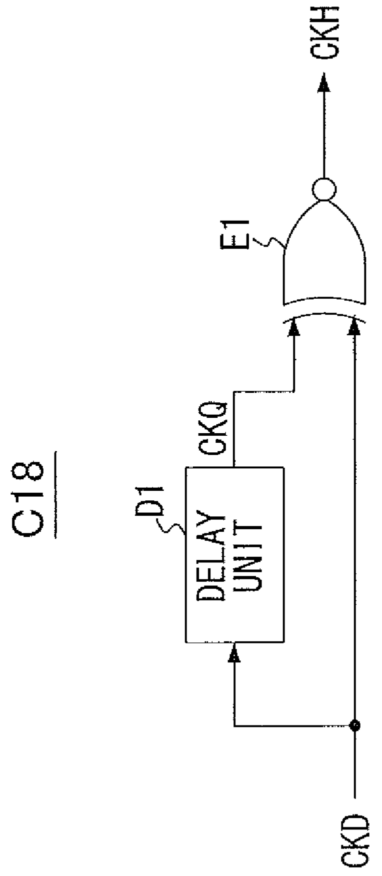
FIG. 5 is a block diagram showing the internal configuration of the clock generation circuit.

FIG. 5 is a diagram showing the internal configuration of the clock generation circuit C18.

As show in FIG. 5, the clock generation circuit C18 includes a delay circuit D1 and an Exclusive NOR gate E1.

The delay circuit D1 delays the ½ frequency-divided clock signal CKD by a predetermined delay time DLY as shown in FIG. 4 to generate a delayed frequency-divided clock signal CKQ, and supplies the delayed frequency-divided clock signal CKQ to the Exclusive NOR gate E1. The delay time DLY is, for example, about 30% to about 70% of a clock cycle T of the clock signal CLK. As shown in FIG. 4, the Exclusive NOR gate E1 generates, as a shaped clock signal CKH, a signal having logic level 1 when a logic level of the ½ frequency-divided clock signal CKD is equal to a logic level of the delayed frequency-divided clock signal CKQ, and a signal having logic level 0 when the logic levels of these signals are different.

With the above-described configuration, as shown in FIG. 4, the clock generation circuit C18 generates, as a shaped clock signal CKH, a clock signal whose frequency is double that of the ½ frequency-divided clock signal CKD, i.e., a clock signal whose frequency is the same as that of the clock signal CK or CLK.

As shown in FIG. 4, the clock generation circuit C18 determines an interval between the adjoining edges of the shaped clock signal CKH between the falling (or rising) edges on the basis of the delay time DLY of the delay circuit D1. That is, the duty ratio of the shaped clock signal CKH is fixed by the delay time DLY of the delay circuit D1. The fall edge of the signal is an edge where the logic level changes from 1 to 0, and the rising edge is an edge where the logic level changes 0 to 1.

The clock generation circuit C18 supplies the shaped clock signal CKH to the output buffer C12.

The output buffer C12 recognizes the shaped clock signal CKH supplied from the clock generation circuit C18 as a clock signal CLK, and transmits the clock signal CLK to the subsequent driver chip IC via the clock line CL.

The following describes an operation of the above-described configuration.

The clock transmission circuit 40, which is provided in each of the five driver chips IC1 to IC5, receives the clock signal CLK from the previous driver chip IC or controller 2 and supplies the clock signal CLK via the clock line CL to the inside latches 41 and 42. Due to the capacity of a clock line inside the driver chip IC, the operations of the latches 41 and 42, and other factors, there is a concern that the duty ratio of the clock signal CLK could change. If the duty ratio changes in each of the driver chips IC1 to IC5, e.g., a period during which the logic level of the clock signal CLK remains 0 increases, the influences of such change are increasingly accumulated in the subsequent driver chips. As a result, a huge gap may arise between a rising edge timing of the clock signal CLK used in the most upstream driver chip IC1 and a rising edge timing of the clock signal CLK used in the most downstream driver chip IC5.

To avoid this, the clock transmission circuit 40 in each driver chip IC transmits the clock signal CLK to the subsequent driver chip IC, with the duty ratio of the clock signal CLK fixed on the basis of the delay time DLY of the delay circuit D1 by means of the ½ frequency division circuit C17 and the clock generation circuit C18.

Figure 6:
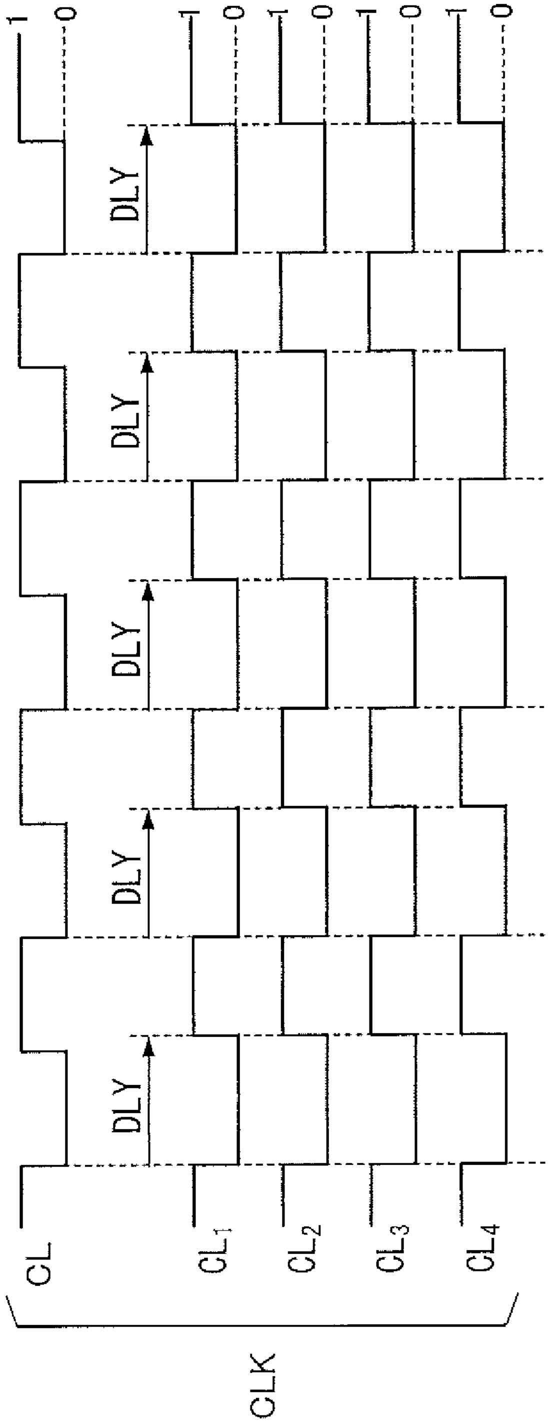
FIG. 6 is a timing chart of clock signals transmitted by four semiconductor IC chips to four clock lines.

According to the clock transmission circuits 40, the duty ratios of the clock signals CLK transmitted from the driver chips IC1 to IC5 are all brought to a predetermined value on the basis of the delay time DLY of the delay circuit D1 as shown in FIG. 6. Therefore, as shown in FIG. 2, even when the clock signal CLK is sequentially supplied to the driver chips IC1 to IC5 through the cascade connections, the effect of the changing duty ratio of the clock signal CLK in each driver chip is not accumulated in the downstream driver chips. That is, the edge timings of the clock signals supplied to the five driver chips are aligned with each other.

The clock transmission circuits 40 have the simple configuration as shown in FIGS. 3 and 5, and are able to fix the duty ratios of the clock signals before transmitting the clock signals CLK to the subsequent driver chips. When compared with those that successively adjust the duty ratios of the clock signals using the PLL or DLL circuits, the clock transmission circuits 40 can be made smaller in size. Thus, it is possible to reduce power consumption and manufacturing costs.

The delay time DLY of the delay circuit D1 may vary according to manufacturing variations, changes in power supply voltage, and/or changes in ambient temperatures.

Figure 7:
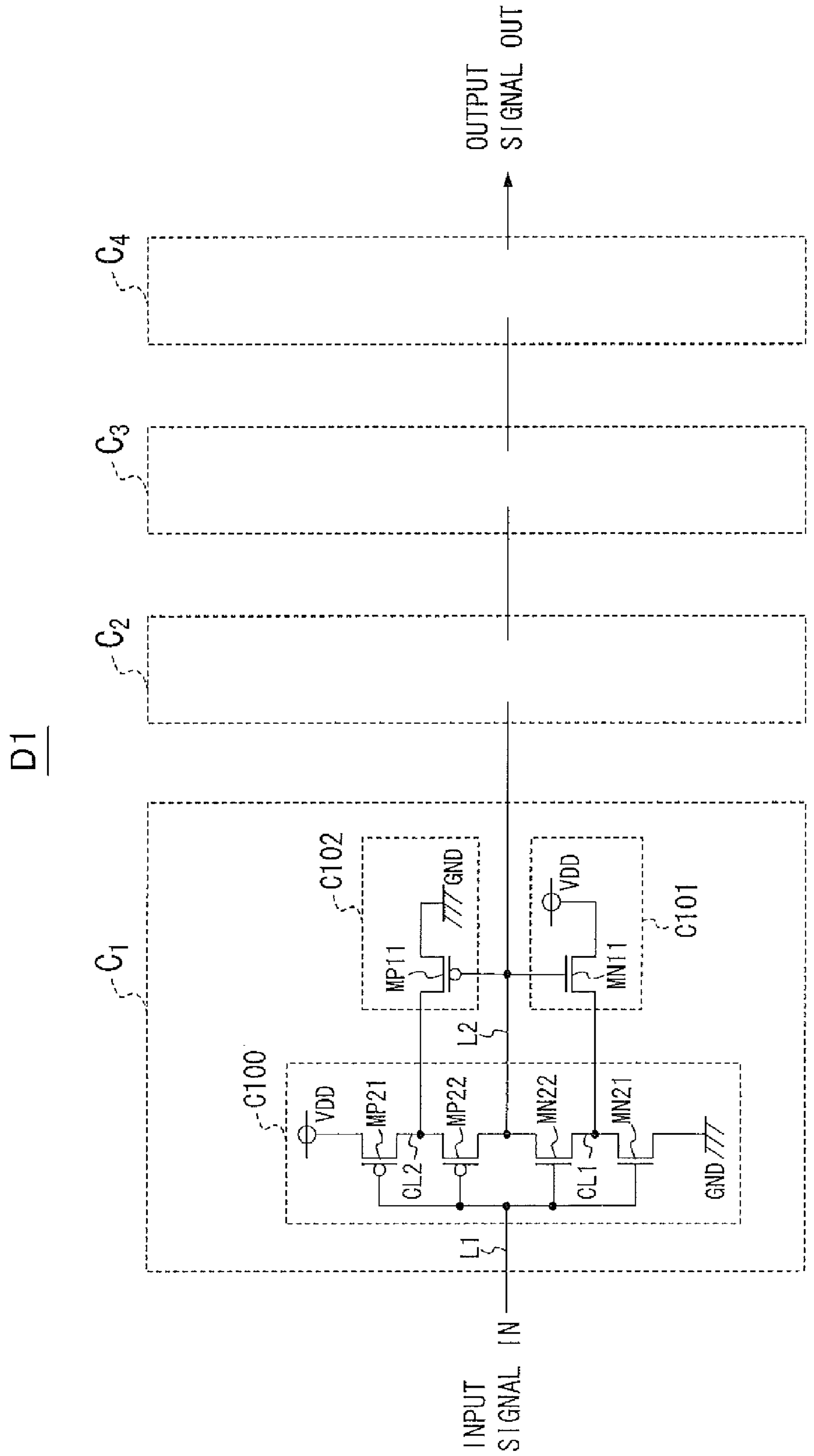
FIG. 7 is a block diagram showing an exemplary internal configuration of a delay circuit.

Accordingly, a delay circuit having the configuration shown in FIG. 7 may be employed as the delay circuit D1. The input signal IN in FIG. 7 is the signal CKD in FIG. 5, and the output signal OUT in FIG. 7 is the signal CKQ in FIG. 5.

As shown in FIG. 7, the delay circuit D1 has four inverters $C_1$ to $C_4$, which have hysteresis respectively and are connected in series.

The inverters $C_1$ to $C_4$ have the same internal configuration. Each of the inverters $C_1$ to $C_4$ has a hysteresis inverter circuit C100 (referred to as an HS inverter circuit C100, hereinafter), a power supply potential applying circuit C101, and a ground potential applying circuit C102.

The HS inverter circuit C100 includes transistors MP21 and MP22, which are P-channel MOS (Metal-Oxide Semiconductor) FETs (Field Effect Transistors). The transistors MP 21 and MP22 in combination serve as a high potential generation unit of the inverter. The HS inverter circuit C100 also includes transistors MN21 and MN22, which are N-channel MOS FETs. The transistors MN21 and MN 22 in combination serve as a low potential generation unit of the inverter. The gate terminals of the transistors MP21, MP22, MN21 and MN22 are all connected to an input line L1. A power supply potential VDD is applied to the source terminal of the transistor MP21, and the drain terminal of the transistor MP21 is connected to the source terminal of the transistor MP22. A ground potential GND is applied to the source terminal of the transistor MN21, and the drain terminal of the transistor MN21 is connected to the source terminal of the transistor MN22. The drain terminals of the transistors MP22 and MN22 are both connected to an output line L2.

In the HS inverter circuit C100, when a signal supplied via the input line L1 has a high potential level corresponding to the power supply potential VDD, the two transistors MN21 and MN22, out of the four transistors MP21, MP22, MN21 and MN22, are turned on, and the ground potential GND is applied to the output line L2. When a signal supplied via the input line L1 has a low potential level corresponding to the ground potential GND, the two transistors MP21 and MP22 among the four transistors MP21, MP22, MN21 and MN22 are turned on, and the power supply potential VDD is applied to the output line L2. That is, when a high-potential (VDD) signal is supplied via the input line L1, i.e., when a signal corresponding to logic level 1 is supplied, the HS inverter circuit C100 inverts the signal to logic level 0 or to low-potential (GND), and transmits a resultant signal to the output line L2. On the other hand, when a low-potential (GND) signal, i.e., a signal corresponding to logic level 0, is supplied, the HS inverter circuit C100 inverts the signal to logic level 1 or to high-potential (VDD), and transmits a resultant signal to the output line L2.

The power supply potential applying circuit C101 includes a transistor MN11, which is a N-channel MOS FET. The power supply potential VDD is applied to the drain terminal of the transistor MN11. The gate terminal of the transistor MN11 is connected to the output line L2, and the source terminal of the transistor MN11 is connected to a connection point or node CL1 where the drain terminal of the transistor MN21 of the HS inverter circuit C100 is connected with the source terminal of the transistor MN22.

In the power supply potential applying circuit C101, the transistor MN11 is turned on only when the HS inverter circuit C100 transmits a high-potential (VDD) signal to the output line L2. Upon turning on of the transistor MN11, the power supply potential applying circuit C101 applies the power supply potential VDD to the connection point CL1 between the transistors MN21 and MN22 of the HS inverter circuit C100.

The ground potential applying circuit C102 includes a transistor MP11, which is a P-channel MOS FET. The ground potential GND is applied to the drain terminal of the transistor MP11. The gate terminal of the transistor MP11 is connected to the output line L2, and the source terminal of the transistor MP11 is connected to a connection point CL2 where the drain terminal of the transistor MP21 of the HS inverter circuit C100 is connected with the source terminal of the transistor MP22.

In the ground potential applying circuit C102, the transistor MP11 is turned on only when the HS inverter circuit C100 transmits a low-potential (GND) signal to the output line L2. Upon turning on of the transistor MP11, the ground potential applying circuit C102 applies the ground potential GND to the connection point CL2 between the transistors MP21 and MP22 of the HS inverter circuit C100.

The following describes an operation of a single inverter C, which includes the HS inverter circuit C100, the power supply potential applying circuit C101, and the ground potential applying circuit C102.

Figure 8:
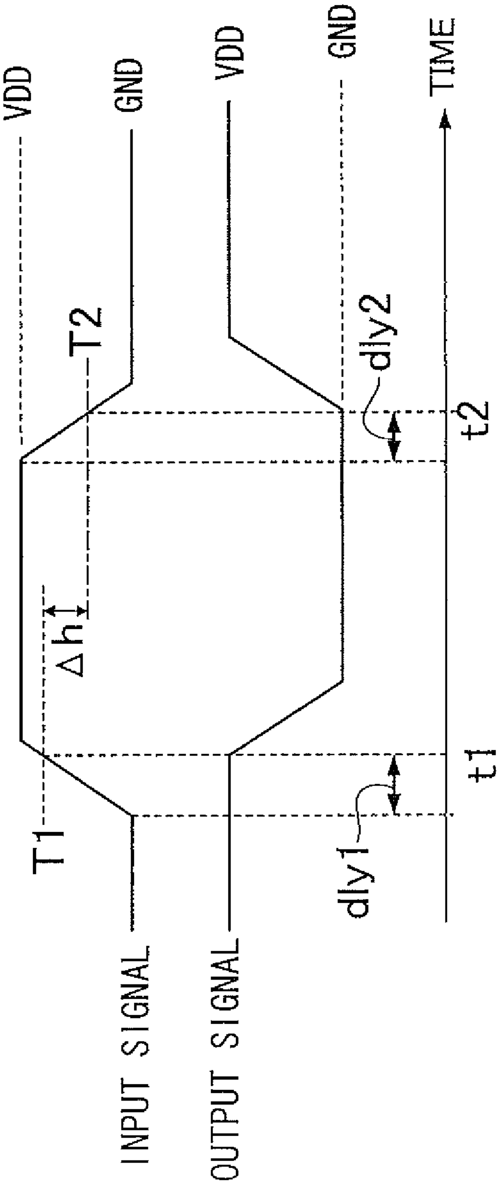
FIG. 8 is a timing chart showing delay characteristics of one of inverters included in the delay circuit shown in FIG. 7.

As shown in FIG. 8, during the rise-up period of the input signal, the level of the output signal of the inverter C starts dropping at time t1 when the input signal level reaches a first threshold T1. During the fall-down period of the input signal, the level of the output signal of the inverter C starts rising at time t2 when the level of the input signal reaches a second threshold T2.

More specifically, immediately before the rising of the input signal, the HS inverter circuit C100 is generating the signal of the high potential (VDD) to the output line L2. This keeps the transistor MN11 of the power supply potential application circuit C101 in an on condition. During this on-condition period the power supply potential VDD is applied to the connection node CL1 between the transistors MN21 and MN22 of the HS inverter circuit C100 through the transistor MN11. The transistor MN21 is subsequently turned on when the voltage applied to the gate terminal of the transistor MN21 exceeds the threshold of the transistor MN21 itself in the rise-up period of the input signal. As a result, the ON resistances of the transistors MN11 and MN21 constitute a voltage division circuit. The voltage division circuit generates a high potential based on the power supply potential VDD, and the generated high potential is applied to the source terminal of the transistor MN22. This increases the apparent threshold of the transistor MN22 by a back-gate bias effect. Thus, the threshold of the inverter is increased. As a consequence, the HS inverter circuit C100 determines that a high potential corresponding to the logic level 1 has been applied, and decreases the level of the output signal for inversion when the signal level of the input signal exceeds the first threshold T1 in the rise-up period of the input signal.

Immediately before the falling of the input signal, the HS inverter circuit C100 is generating the signal of the low potential (GND) to the output line L2. This keeps the transistor MP11 of the ground potential application circuit C102 in an on condition. During this on-condition period the ground potential GND is applied to the connection node CL2 between the transistors MP21 and MP22 of the HS inverter circuit C100 through the transistor MP11. The transistor MP21 is subsequently turned on when the voltage applied to the gate terminal of the transistor MP21 reaches the threshold of the transistor MP21 itself in the fall-down period of the input signal. As a result, the ON resistances of the transistors MP11 and MP21 form a voltage division circuit. The voltage division circuit generates a low potential based on the ground potential GND, and the generated low potential is applied to the source terminal of the transistor MP22. This lowers the apparent threshold of the transistor MP22 by a back-gate bias effect, and accordingly the threshold of the inverter is lowered. As a consequence, the HS inverter circuit C100 determines that a low potential corresponding to the logic level 0 has been applied, and increases the level of the output signal for inversion when the signal level of the input signal falls below the second threshold T2 in the fall-down period of the input signal.

As shown in FIG. 8, during the rise-up period of the input signal from the ground potential GND level (logic level 0), the inverter C starts decreasing the level of the output signal, which has been maintained in the level of the power supply potential VDD (logic level 1), down to the level of the ground potential GND at the time t1 when the level of the input signal reaches the first threshold T1. On the other hand, as shown in FIG. 8, in the fall-down period of the input signal from the power supply potential VDD level (logic level 1), the inverter C starts increasing the level of the output signal up to the power supply potential VDD level at the time t2 when the level of the input signal reaches the second threshold T2 (T1>T2).

In the rise-up period of the input signal, the inverter C therefore decreases the level of the output signal for level inversion with a delay dly1 as shown in FIG. 8. On the other hand, in the fall-down period of the input signal, the inverter C increases the level of the output signal for level inversion with a delay dly2 as shown in FIG. 8.

The difference between the first threshold T1 and the second threshold T2 shown in FIG. 8 is a hysteresis width Δh. The greater the hysteresis width Δh, the longer the delay times dly1 and dly2. The hysteresis width Δh increases as the drain current of the transistor MN11 of the power supply potential application circuit C101 and that of the transistor MP11 of the ground potential application circuit C102 increase. The drain currents of the respective transistors MN11 and MP11 can thus be used to set the delay times dly1 and dly2 of the inverter C to desired delay times.

Figure 9:
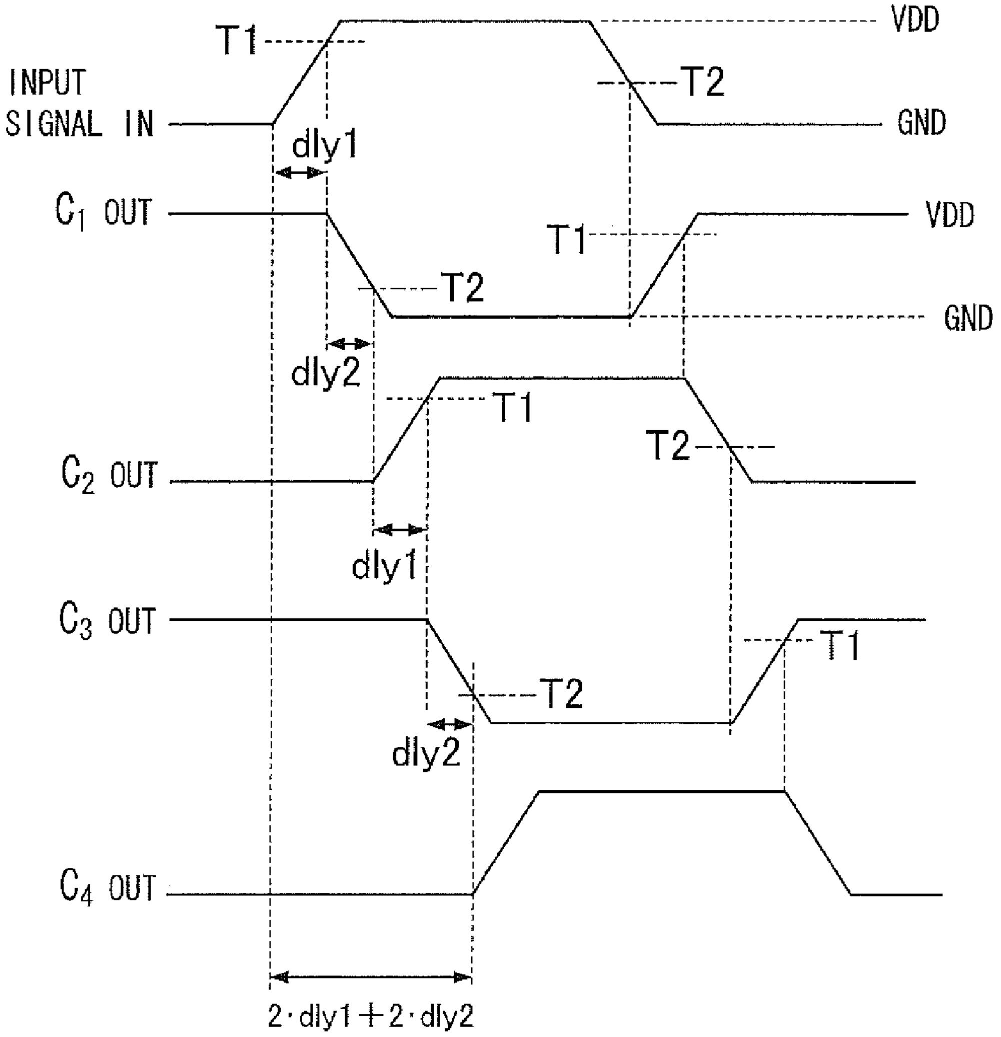
FIG. 9 is a timing chart showing a delay operation of the delay circuit shown in FIG. 7.

The delay circuit shown in FIG. 7 includes the four inverters $C_1$ to $C_4$ connected in series, and each inverter possesses the delay times dly1 and dly2. As shown in FIG. 9, the delay circuit thereby delays the input signal IN by the delay time of 2·dly1+2·dly2 for output. In short, the drain currents of the transistors MN11 and MP11 are decided such that the delay time of 2·dly1+2·dly2 becomes equal to the delay time DLY shown in FIG. 4.

It should be noted that the number of stages of inverters C to be connected in series is not limited to four. Two, three, five or more inverts C may be connected in series. Alternatively, a single inverter C may be used alone. The delay time varies in proportion to the number of inverters C, and inverters C may be connected in series as many as a desired delay time (i.e., the delay time DLY shown in FIG. 4) is obtained.

Semiconductor integrated devices of MOS structures vary in operating speed depending on the ambient temperature.

Figure 10:
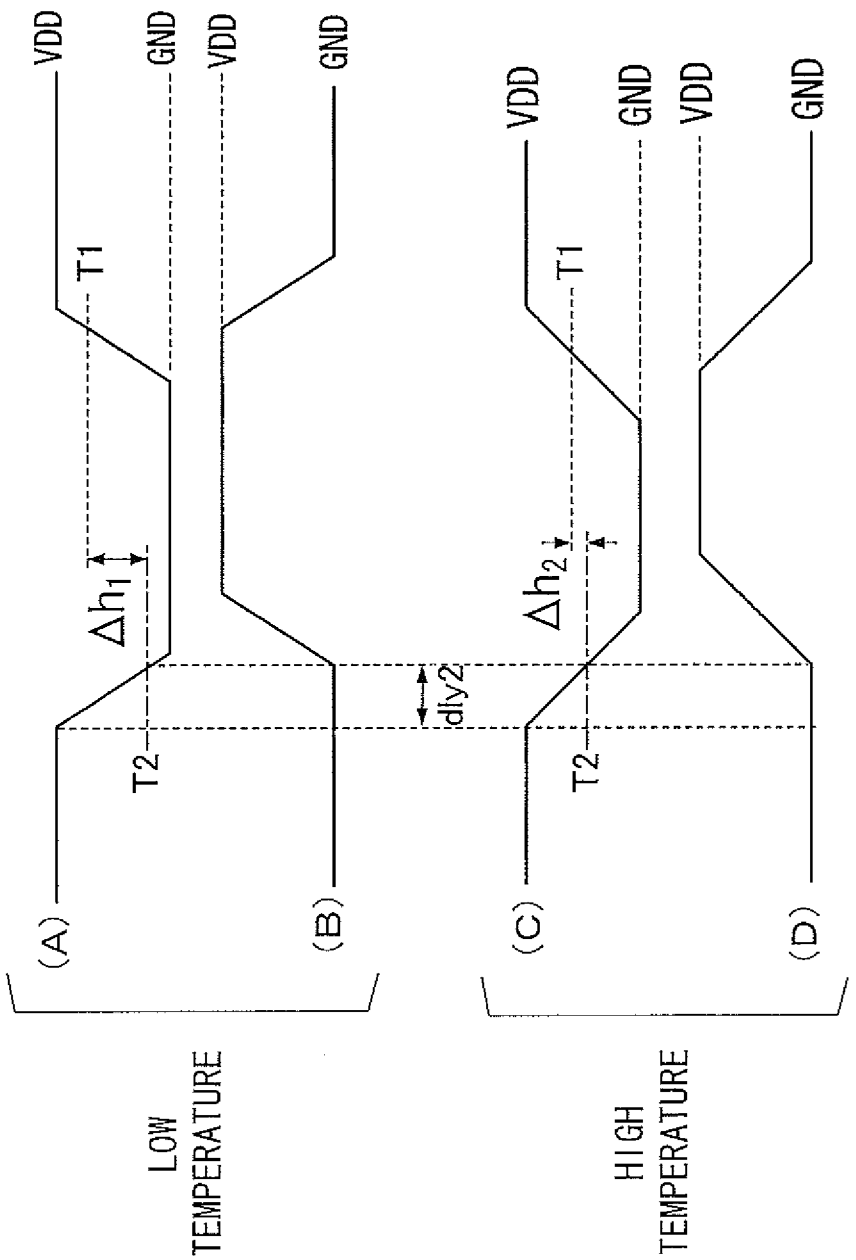
FIG. 10 illustrates delay characteristics of the inverter for two ambient temperatures (high and low temperatures)

For example, an input signal having a waveform indicated by the curve (A) in FIG. 10 is supplied to the inverter C when the ambient temperature is low. An input signal having a waveform indicated by the curve (C) in FIG. 10 is supplied to the inverter C when the ambient temperature is high. That is, as indicated by the curves (A) and (C) in FIG. 10, the level transitions in the rising and falling periods of the input signal are gentler at high ambient temperature than at low ambient temperature.

At low ambient temperature, the transistor MP41 has a lower ON resistance, which in turn increases the potential of the source terminal of the transistor MN22. On the other hand, at high ambient temperature, the transistor MN11 has a higher ON resistance, which in turn decreases the potential of the source terminal of the transistor MN22. Consequently, when the ambient temperature is high as shown by the curve (C) in FIG. 10, the first threshold T1 of the inverter C in the rising part of the input signal is lower than when the ambient temperature is low as shown by the curve (A) in FIG. 10.

Similarly, at low ambient temperature, the transistor MP11 has a lower ON resistance, which in turn decreases the potential of the source terminal of the transistor MP22. At high ambient temperature, the transistor MP11 has a higher ON resistance, which in turn increases the potential of the source terminal of the transistor MP22. Consequently, when the ambient temperature is high as shown by the curve (C) in FIG. 10, the second threshold T2 of the inverter C in the falling period of the input signal is higher than when the ambient temperature is low as shown by the curve A. In short, as understood from the curves (A) and (C) in FIG. 10, the hysteresis width Δh2 at high ambient temperature is smaller than the hysteresis width Δh1 at low ambient temperature.

At high ambient temperature, the level transitions in the rising and falling periods of the input signal are gentler and the delay time is longer than at low ambient temperature. The increase in delay time, however, is suppressed since the hysteresis width Δh decreases with the increasing ambient temperature. This reduces a difference between the delay time dly2 of the output signal at low temperature shown by the curve (B) in FIG. 10, obtained from the input signal shown by the curve (A) in FIG. 10, and the delay time dly2 of the output signal at high temperature shown by the curve (D) in FIG. 10, obtained from the input signal shown by the curve (C) in FIG. 10.

As described above, the inverter C utilizes the changes in the ON resistances of the transistors MN11 and MP11 with ambient temperature to self-adjust the delay time to a constant value regardless of changes in ambient temperature.

The inverter C shown in FIG. 7 can suppress changes in delay time even if the drain currents of the transistors vary with manufacturing variations and/or variations in the power supply potential VDD. More specifically, when the drain currents of the transistors are lower than predetermined values, the level transitions in the rising and falling periods of the output signal become gentler and the delay time becomes longer as in the case of high ambient temperature shown in by the curves (C) and (D) in FIG. 10. In the meantime, the hysteresis width Δh decreases with the increasing drain currents of the transistors, and such a decrease functions to suppress the increase in delay time. As a result, the inverter C can suppress changes in delay time in spite of variations in the drain currents of the transistors.

As described above, the delay circuit D1 adopts the structure in which the inverters C are connected in series as shown in FIG. 7. Therefore, regardless of manufacturing variations, changes in power supply voltage, and/or changes in ambient temperatures, it is possible to curb or eliminate changes in the delay time DLY.

Since the structure shown in FIG. 7 is employed as the delay circuit D1 of the clock transmission circuit 40, it is possible to transmit a clock signal whose duty ratio is stable to the subsequent driver chips regardless of manufacturing variations, changes in power supply voltage, and/or changes in ambient temperatures.

Figure 11:
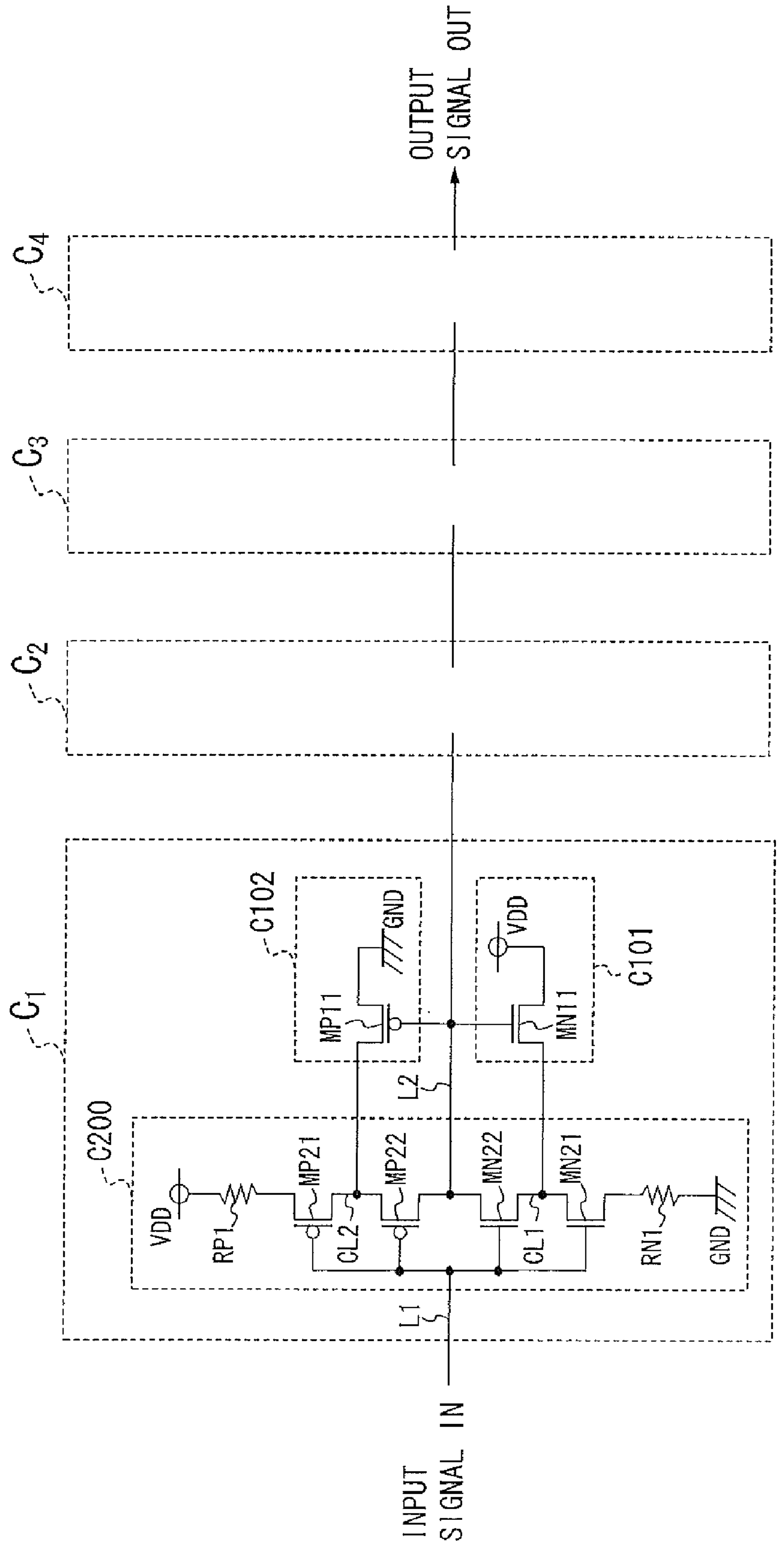
FIG. 11 is a block diagram showing another example of the internal configuration of the delay circuit.

In the inverter C shown in FIG. 7, another HS inverter circuit C200 shown in FIG. 11 may be employed instead of the HS inverter circuit C100.

The configuration of the HS inverter circuit C200 shown in FIG. 11 is the same as that of the HS inverter circuit C100 except for the following points: the power supply potential VDD is applied to the source terminal of the transistor MP21 via a resistor RP1, and the ground potential GND is applied to the source terminal of the transistor MN21 via another resistor RN1. The power supply potential applying circuit C101 and ground potential applying circuit C102 provided in the inverter C are the same as those shown in FIG. 7.

In the HS inverter circuit C200, it is possible to set arbitrary delay times dly1 and dly2 using the resistance values of the resistors RP1 and RN1. That is, as the resistance values of the resistors RP1 and RN1 increase, the changes in the level of the output signal over time become moderate, and therefore the delay times dly1 and dly2 become longer. On the other hand, as the resistance values of the resistors RP1 and RN1 decrease, the changes in the level of the output signal over time become sharp, and therefore the delay times dly1 and dly2 become shorter. In this manner, when the delay times dly1 and dly2 are set by the resistors RP1 and RN1, the influences of manufacturing variations become smaller than when the delay times dly1 and dly2 are set by the drain current of a transistor. Accordingly, it is possible to set the desired delay times dly1 and dly2 with high accuracy.

Figure 12:
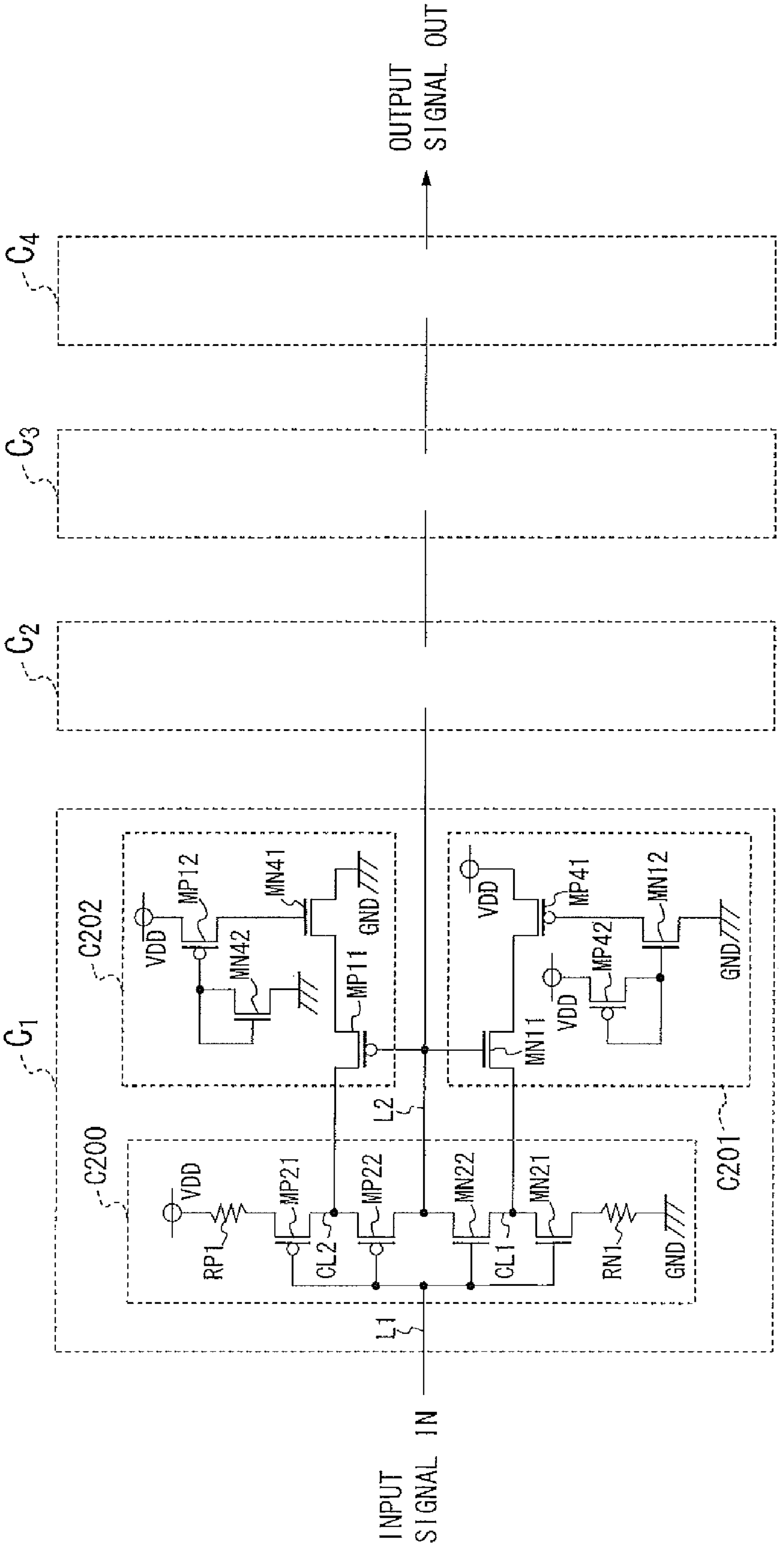
FIG. 12 is a block diagram showing still another example of the internal configuration of the delay circuit.

Instead of the power supply potential applying circuit C101 and the ground potential applying circuit C102 of the inverter C shown in FIG. 11, a power supply potential applying circuit C201 and ground potential applying circuit C202 shown in FIG. 12 may be employed.

The power supply potential applying circuit C201 shown in FIG. 12 includes transistors MP41 and MP42, which are P-channel MOS FETs, and transistors MN11 and MN12, which are N-channel MOS FETs. The power supply potential VDD is applied to the source terminal of the transistor MP42. The gate and drain terminals of the transistor MP42 are connected to the gate terminal of the transistor MN12. The ground potential GND is applied to the source terminal of the transistor MN12. The drain terminal of the transistor MN12 is connected to the gate terminal of the transistor MP41. The power supply potential VDD is applied to the source terminal of the transistor MP41. The drain terminal of the transistor MP41 is connected to the drain terminal of the transistor MN11. Accordingly, the transistors MP41, MP42 and MN12 are always in an on condition. As a result, the power supply potential VDD is constantly applied to the drain terminal of the transistor MN11 via the transistor MP41. The gate terminal of the transistor MN11 is connected to the output line L2. The source terminal of the transistor MN11 is connected to a connection point or node CL1 between the drain terminal of the transistor MN21 of the HS inverter circuit C200 and the source terminal of the transistor MN22.

In the power supply potential applying circuit C201, the power supply potential VDD is applied to the drain terminal of the transistor MN11 via the transistor MP41. In order to maintain the transistor MP41 in the on condition always, the ground potential GND is applied to the gate terminal of the transistor MP41 via the transistors MN12 and MP42.

Accordingly, like the power supply potential applying circuit C101, the transistor MN11 in the power supply potential applying circuit C201 is turned on only when the output line L2 is at high potential (VDD). Upon turning on of the transistor MN11, the power supply potential VDD is applied to the connection point CL1 of the HS inverter circuit C200 via the transistors MP41 and MN11.

The ground potential applying circuit C202 includes transistors MP11 and MP12, which are P-channel MOS FETs, and transistors MN41 and MN42, which are N-channel MOS FETs. The ground potential GND is applied to the source terminal of the transistor MN42. The gate and drain terminals of the transistor MN42 are connected to the gate terminal of the transistor MP12. The power supply potential VDD is applied to the source terminal of the transistor MP12, and the drain terminal of the transistor MP12 is connected to the gate terminal of the transistor MN41. The ground potential GND is applied to the source terminal of the transistor MN41, and the drain terminal of the transistor MN41 is connected to the drain terminal of the transistor MP11. Accordingly, the transistors MN41, MN42 and MP12 are always in an on condition. As a result, the ground potential GND is constantly applied to the drain terminal of the transistor MP11 via the transistor MN41. The gate terminal of the transistor MP11 is connected to the output line L2, and the source terminal of the transistor MP11 is connected to a connection point CL2 between the drain terminal of the transistor MP21 of the HS inverter circuit C200 and the source terminal of the transistor MP22.

In the ground potential applying circuit C202, the ground potential GND is applied to the drain terminal of the transistor MP11 via the transistor MN41. In order to always keep the transistor MN41 in the on condition, the power supply potential VDD is applied to the gate terminal of the transistor MN41 via the transistors MP12 and MN42.

Accordingly, like the ground potential applying circuit C102, the transistor MP11 in the ground potential applying circuit C202 is turned on only when the output line L2 is at low potential (GND). Upon turning on of the transistor MP11, the ground potential GND is applied to the connection point CL2 of the HS inverter circuit C200 via the transistors MN41 and MP11.

Even when the inverter C shown in FIG. 12 is employed in place of the inverter C shown in FIG. 7 or 11, it is still possible to build a delay circuit having the delay characteristics illustrated in FIGS. 8 and 9.

The inverter shown in FIG. 12 makes use of the fact that the on-resistances of the transistors MP41, MN11, MN41 and MP11 change with an ambient temperature when self-regulating the delay time (i.e., self-keeping the delay time constant) regardless of changes in ambient temperature as shown in FIG. 10. Therefore, like the inverter C shown in FIG. 7 or FIG. 11, the inverter shown in FIG. 12 is also able to reduce or eliminate the change in the delay time thereof even if the drain current of a transistor varies due to manufacturing variations and/or changes in the power supply potential VDD. That is, when the drain current of the transistor is smaller than a predetermined level, the changes in the level of the output signal during the rising and falling periods of the output signal become moderate as in the case where the ambient temperature is high as shown in FIG. 10, and this moderation results in an increase in the delay time. However, the hysteresis width Δh becomes narrower as the drain current of the transistor decreases. As a result, an increase in the delay time thereof is suppressed as the transistor drain current drops. Thus, in spite of the variations in the transistor drain current, the inverter C can control the delay time thereof.

In the inverter C shown in FIG. 12, the transistor MP41 is a source of the power supply potential VDD in the power supply potential applying circuit C201. In order to fix the transistor MP41 in the on condition, the ground potential GND is not applied directly to the gate terminal of the transistor MP41, but to the gate terminal of the transistor MP41 via the transistors MP42 and MN12. The transistor MN41 is a source of the ground potential GND in the ground potential applying circuit C202, and in order to fix the transistor MN41 in the on condition the power supply potential VDD is not applied directly to the gate terminal of the transistor MN41, but to the gate terminal of the transistor MN41 via the transistors MN42 and MP12.

Therefore, even when electrostatic discharge occurs, it is possible to avoid electrostatic breakdowns from the gate terminals of the transistors MP41 and MN41.

In the power supply potential applying circuit C201 and ground potential applying circuit C202, there is no element that constantly consumes large amounts of current as direct current does not always flow therethrough. Therefore, it is possible to reduce power consumption.

This application is based on Japanese Patent Application No. 2010-224816 filed on Oct. 4, 2010 and the entire disclosure thereof is incorporated herein by reference.

What is claimed is:

1. A display panel driving device for use with a display panel having a plurality of signal lines and a plurality of scan lines, with a plurality of pixel units being formed at crossing portions of the signal lines and scan lines, said display panel driving device comprising:

a signal line driver that applies, on the basis of an input image signal, a pixel driving voltage to each of said signal lines, wherein said signal lines are grouped into a plurality of signal line groups, said signal line driver includes a plurality of driver chips, which are associated with the plurality of signal line groups respectively, and the driver chips are connected in cascade through a clock line;

each said driver chip includes a pixel driving voltage generation unit and a clock transmission unit, the pixel driving voltage generation unit applies the pixel driving voltage to each of those signal lines which belong to the associated signal line group at a timing corresponding to a clock signal supplied via said clock line, and the clock transmission unit transmits the clock signal supplied via said clock line to a subsequent one of said driver chips via said clock line; and said clock transmission unit includes a ½ frequency division circuit, a delay circuit and an Exclusive NOR gate such that the ½ frequency division circuit generates a frequency-divided clock signal by half-dividing a cycle of said clock signal supplied, the delay circuit generates a delayed frequency-divided clock signal by delaying the frequency-divided clock signal by a predetermined delay time, and the Exclusive NOR gate generates a shaped clock signal having a first level and a second level, the shaped clock signal has the first level in a period when a logic level of said delayed frequency-divided clock signal is equal to a logic level of said frequency-divided clock signal, the shaped clock signal has the second level in a period when the logic levels are different, and the Exclusive NOR gate transmits the shaped clock signal having the first and second levels to said subsequent driver chip via said clock line, said shaped clock signal being shaped to the same waveform as said clock signal introduced to the ½ frequency division circuit, wherein the delay circuit includes a plurality of inverters that are connected in series and each of the inverters includes a pair of first FETs have a first conductivity type channel, with a drain of one of the first FETs being connected to a source of the other first FET at a first connection point, gates of the first FETs being connected together at an input point, a first potential being applied to a source of said one of the first FETs, and a drain of said other first FET being connected to an output point, a pair of second FETs having a second conductivity type channel, with a drain of one of the second FETs being connected to a source of the other second FET at a second connection point, gates of the second FETs being connected together at said input point, a second potential being applied to a source of said one of the second FETs, and a drain of said other second FET being connected to said output point, a first additional FET that applies said second potential to said first connection point when said output point is at said second potential, a second additional FET that applies said first potential to said second connection point when said output point is at said first potential, a third additional FET that is always in an on condition and applies said second potential to said first additional FET, a fourth additional FET that is always in an on condition and applies said first potential to said second additional FET, a fifth additional FET whose drain is connected to a gate of said third additional FET, with said first potential being applied to a source of the fifth additional FET, a sixth additional FET whose gate and drain are both connected to a gate of said fifth additional FET, with said second potential being applied to a source of the sixth additional FET, a seventh additional FET whose drain is connected to a gate of said fourth additional FET, with said second potential being applied to a source of the seventh additional FET, and an eighth additional FET whose gate and drain are both connected to a gate of said seventh additional FET, with said first potential being applied to a source of the eighth additional FET.

2. The display panel driving device according to claim 1, wherein said first potential is applied to the source of said one of the first FETs via a first resistor, and said second potential is applied to the source of said one of the second FETs via a second resistor.

3. The display panel driving device according to claim 2, wherein each of the first and second resistors has a variable resistance.

4. The display panel driving device according to claim 2, wherein the first and second resistors can change the predetermined delay time of the delay circuit.

5. The display panel driving device according to claim 2, wherein the first potential is a ground potential and the second potential is a power source potential.

6. The display panel driving device according to claim 1, wherein said predetermined delay time is about 30% to about 70% of the clock cycle of said clock signal.

7. The display panel driving device according to claim 1, wherein the display panel is a liquid crystal display panel.

8. The display panel driving device according to claim 1, wherein each said first FETs is a p-channel MOSFET, and each said second FETs is an n-channel MOSFET.

9. The display panel driving device according to claim 1, wherein the first potential is a ground potential and the second potential is a power source potential.

10. The display panel driving device according to claim 1, wherein how many said inverters are included in the delay circuit is determined by the predetermined delay time.

11. The display panel driving device according to claim 1 further comprising a scan line driver for supplying selection signals to the scan lines.

12. The display panel driving device according to claim 1, wherein the first level is a logic 1 and the second level is a logic 0.

13. The display panel driving device according to claim 1, wherein the ½ frequency division circuit sends the frequency-divided clock signal to the delay circuit and the Exclusive NOR gate only.

* * * * *